United States Patent [19]

Deguchi et al.

[11] Patent Number: 5,059,986

[45] Date of Patent: Oct. 22, 1991

[54] THERMAL HEAD

[75] Inventors: Katsuyasu Deguchi, Nara; Takatoshi Mizoguchi, Gojo; Takayuki Taminaga, Yamatokoriyama; Akiyoshi Fujii, Ikoma, all of Japan

[73] Assignee: Sharp Kabushiki Kaisha, Japan

[21] Appl. No.: 566,506

[22] Filed: Aug. 13, 1990

[30] Foreign Application Priority Data

Aug. 28, 1989 [JP] Japan .................................. 1-222173

[51] Int. Cl.[5] ...................... H04N 1/032; B41J 2/345; B41J 2/335

[52] U.S. Cl. ................................................ 346/76 PH

[58] Field of Search ................................... 346/76 PH

[56] References Cited

U.S. PATENT DOCUMENTS 4,492,482 1/1985 Eguchi et al. .................. 346/76 PH

FOREIGN PATENT DOCUMENTS 113250 7/1984 European Pat. Off. .

133250 7/1984 European Pat. Off. .

3439632 4/1986 Fed. Rep. of Germany .

*Primary Examiner*—Benjamin R. Fuller

*Assistant Examiner*—Huan Tran

*Attorney, Agent, or Firm*—Nixon & Vanderhye

[57] ABSTRACT

A thermal head including a substrate, a thermal element array including a plurality of thermal elements linearly disposed on the substrate, a plurality of driver ICs provided on the substrate and including a plurality of drive circuit elements for controlling the thermal elements through electric conduction in accordance with a print signal, two common electrode patterns provided on the substrate, a first wiring pattern provided on the substrate for connecting each one end of each adjacent pair of the thermal elements commonly to one of the drive circuit elements, second and third wiring patterns provided on the substrate for connecting the other ends of the thermal elements separately to two common electrodes, the plurality of driver ICs being disposed along the thermal element array, the two common electrodes being arranged on opposite sides of the thermal element array and output terminals of the driver ICs, one of the adjacent thermal elements being formed of a single thermal resistor while the other is formed of two thermal resistors.

6 Claims, 9 Drawing Sheets

FIG. 10 (a) (PRIOR ART)
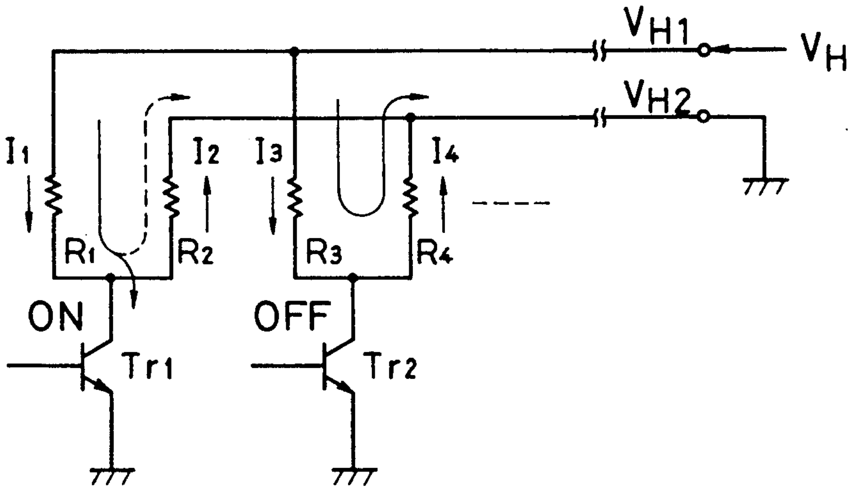
FIG. 10 (b) (PRIOR ART)
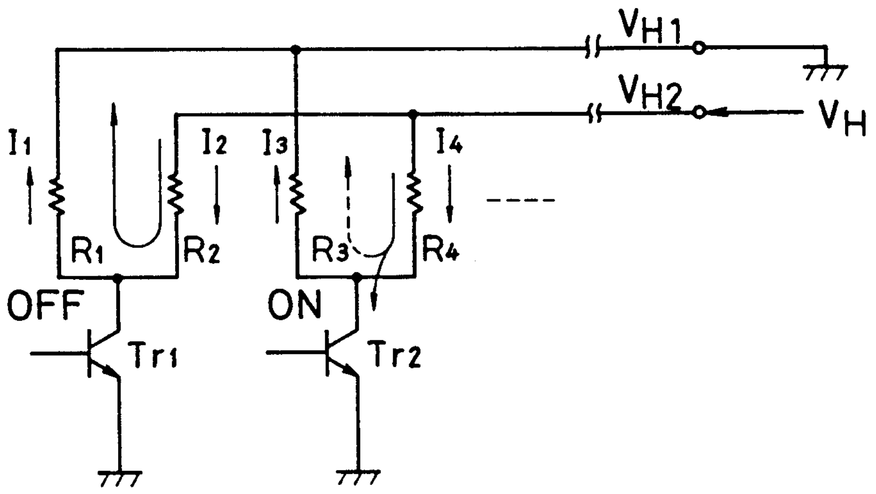

THERMAL HEAD

BACKGROUND OF THE INVENTION

1. Field of the Invention

The present invention relates to a thermal head, and more specifically, it relates to a thermal head which has a plurality of thermal elements and drive circuit elements for controlling the thermal elements through electrical conduction in accordance with a print signal, where each of the drive circuit elements drives the thermal elements corresponding to two print dots on the basis of time-division.

2. Description of the Prior Art

Conventionally, with a line-type thermal head having a plurality of thermal resistors, many of them are of the type in which a single drive circuit element D drives a single thermal resistor R, as shown in FIG. 6, or a single circuit element B drives a plurality of thermal resistors R, using a blocking diode D, as shown in FIG. 7.

With the thermal head of the latter type, however, it does not require as many drive circuit elements D as the thermal head of the former type has, but requires the block diodes B as many as the thermal resistors R and a switching circuit for common electrodes VH1, VH2, etc.

Allowing for the problems mentioned above, a $\frac{1}{2}$-dynamic drive system in which no blocking diode is used, as shown in FIG. 8, is invented. In this system, a single drive circuit element D drives two thermal resistors R on the basis of time-division, as shown in FIG. 10.

FIGS. 10(*a*) and 10(*b*) are diagrams showing currents I1 to I4 flow in thermal resistors R1 to R4 when drive circuit elements Tr1 and Tr2 turn ON and OFF, respectively. FIG. 10 (*a*) is a circuit diagram showing a case in which drive voltage VH is applied to a common electrode VH1 of the odd thermal resistors, while no voltage is applied to an even common voltage VH2: since an element Tr1 turns ON, $I1 >> I2$ is satisfied, whereby the thermal resistor R1 heats up to be ready for printing, while the thermal resistor R2 does not heat up. The currents I3 and I4 flowing in the thermal resistors R3 and R4 satisfy the relations, $I3 = I4 \approx I1 \times (\frac{1}{2})$ because the element Tr2 turns OFF. Thus, the thermal resistors R3 and R4 heat up by approximately a quarter of the heating amount of the thermal resistor R1, and this makes no contribution to printing. FIG. 10 (*b*) shows a case in which drive voltage is applied only to the common electrode VH2, where since $I1 = I2 \approx I4 \times (\frac{1}{2}) > I3$ is satisfied, the thermal resistor R4 alone is ready for printing.

As has been described, using a phenomenon that current flows in the thermal resistors not involved in printing by a half of the current flowing when they are driven but thermosensible paper is not color-developed by the current, no blocking diode is necessitated. In driving them, first drive voltage is applied to the common electrode VH1, and the drive circuit elements are turned ON/OFF corresponding to odd print dots to drive the odd thermal resistors. Then, drive voltage is applied to the common electrode VH2, and the drive circuit elements are turned ON/OFF corresponding to the even print dots to drive the even thermal resistors. In this way, a single line printing is carried out.

FIG. 9 is a diagram showing a main part of a wiring pattern of the thermal head shown in FIG. 8. The odd thermal resistors R2*n*−1 are connected to the common electrode VH1, while the even thermal resistors R2*n* are connected to the common electrode VH2, but since they cannot be wired in a single layer pattern, a layer insulating film F is formed between the common electrodes VH1 and VH2.

In the above-mentioned prior art embodiments, the embodiment shown in FIG. 8 is composed of the smallest number of components, but it is not so advantageous in price because a layer insulating film must be formed. Instead of forming the layer insulating film, there is proposed an idea that thermal resistors are formed on heat-resisting resin substrate and wired with through-holes. However, with the circuit shown in FIG. 8, the through-holes must be formed every other thermal resistor, and thus it is very difficult to form the through-holes, allowing for the pitch of the thermal resistors (e.g., 125 μm). Additionally, if possible, the number of the through-holes is excessively large to lose any merit in price.

SUMMARY OF THE INVENTION

The present invention provides a thermal head comprising a substrate, a thermal element array including a plurality of thermal elements linearly disposed on said substrate, a plurality of driver ICs provided on said substrate and including a plurality of drive circuit elements for controlling said thermal elements through electric conduction in accordance with a print signal, two common electrode patterns provided on said substrate, a first wiring pattern provided on said substrate for connecting each one end of each adjacent pair of the thermal elements commonly to one of said drive circuit elements, second and third wiring patterns provided on said substrate for connecting the other ends of said adjacent thermal elements separately to the two common electrodes; said plurality of driver ICs being disposed along said thermal element array, said two common electrodes being arranged on opposite sides of the thermal element array and output terminals of said driver ICs, one of said adjacent thermal elements being formed of a single thermal resistor while the other is formed of two thermal resistors, each of said adjacent thermal elements having said second wiring pattern connecting one end of one thermal element to said common electrode placed close to said thermal element array, said first wiring pattern connecting the common connection terminal of both of said thermal elements to the output terminal of said driver IC, and said third wiring pattern connecting one end of the other thermal element to the other common electrode.

With the above-mentioned adjacent thermal elements, the resistance values of the respective thermal resistors are set so that the respective heating amounts are equivalent to each other. The above-mentioned substrate is preferably a heat-resisting insulating substrate, and further, each of the above-mentioned driver ICs preferably includes a shift register, a latch circuit, a switching circuit and a plurality of drive circuit elements. The driver ICs are attached to the substrate by a wire bonding method or a face down bonding method.

In accordance with the present invention, two print dots are controlled by a single drive circuit element, where one of the print dots is formed of two thermal resistors connected in series, and a connection pattern (the third wiring pattern) to the common electrode is led to the same direction of a discrete electrode pattern (the second wiring pattern), whereby the thermal resistors are wired into an electrode pattern without a layer insulating film nor through-holes.

BRIEF DESCRIPTION OF THE DRAWINGS

FIGS. 10(*a*) and 10(*b*) are diagrams for explaining the operation of the embodiment shown in FIG. 8;

DESCRIPTION OF THE PREFERRED EMBODIMENTS

Embodiments of the present invention will now be described in detail in conjunction with the accompanying drawings.

Figure 1:
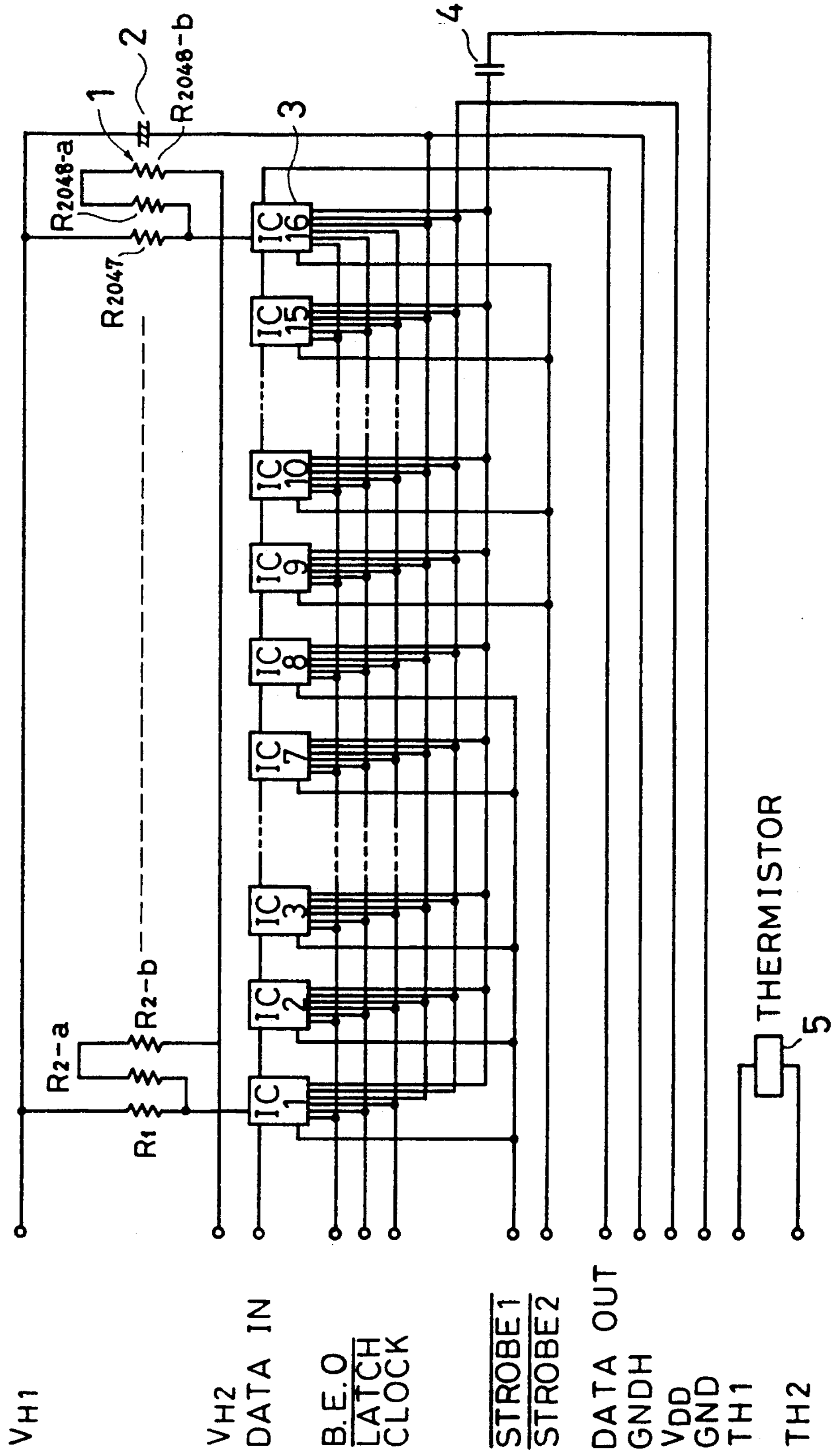
FIG. 1 is a circuit diagram showing an embodiment according to the present invention.

FIG. 1 is a connection diagram showing a thermal head of an embodiment of the present invention. The thermal head includes a thermal element array 1 having 2048 print dots, a driver integrated circuit 3 (IC1 to IC16) including a shift register, a latch circuit, a drive circuit element, a switching circuit, etc., a thermistor 5 sensing the temperature of the thermal head, and bypass-capacitors 2 and 4 eliminating switching noise. The thermal element array 1 has odd thermal elements connected to a common electrode VH1 and even thermal elements connected to a common electrode VH2. Each of the odd thermal elements $R2n-1$ is formed of a single thermal resistor, while each of the even thermal elements $R2n$ ($n=1$ to 1024) is formed of two thermal resistors, $R2n-a$ and $R2n-b$, connected in series. All the components shown in FIG. 1 are provided on a single heat-resisting resin substrate, and the driver integrated circuit 3, in particular, is attached to the substrate by a wire bonding method or a face down bonding method.

Figure 2:
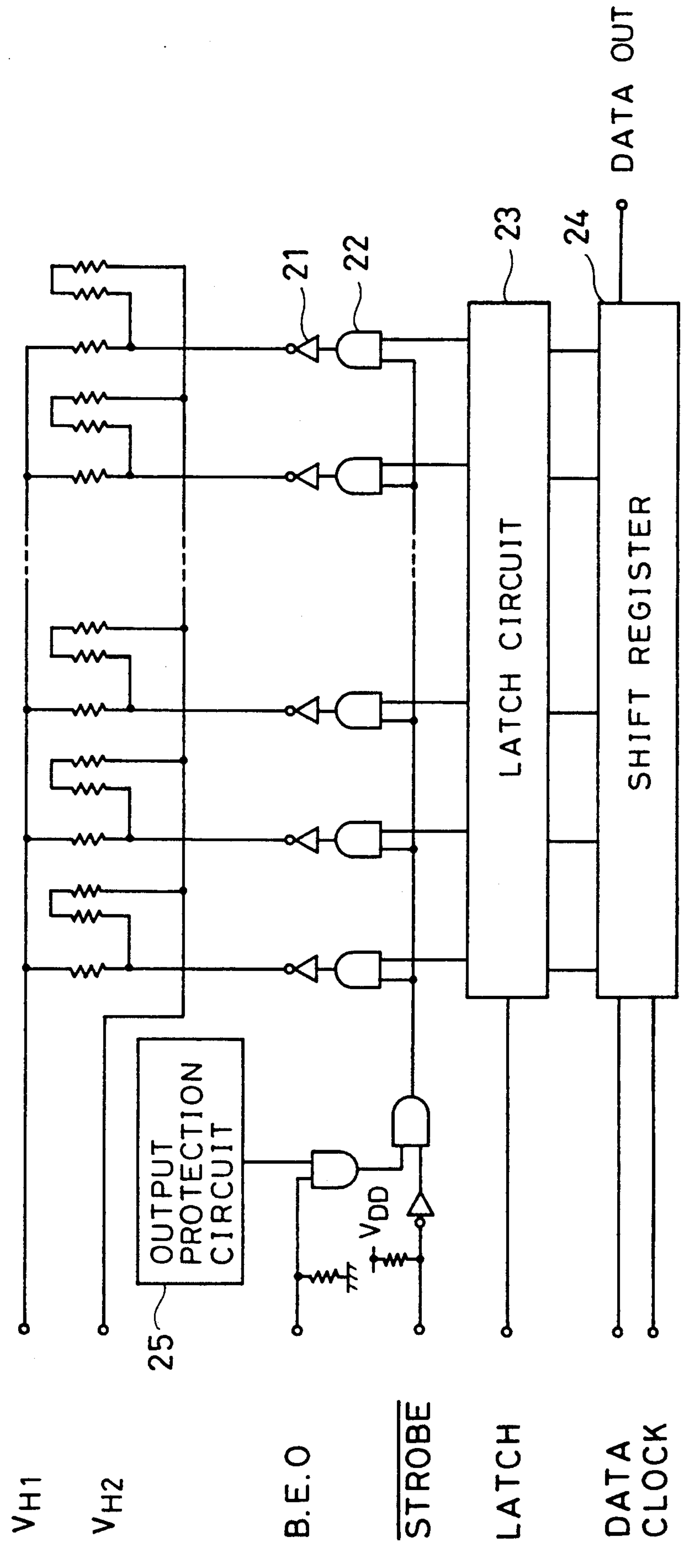
FIG. 2 is a basic circuit diagram showing a driver integrated circuit used in the embodiment shown in FIG. 1.
Figure 3:
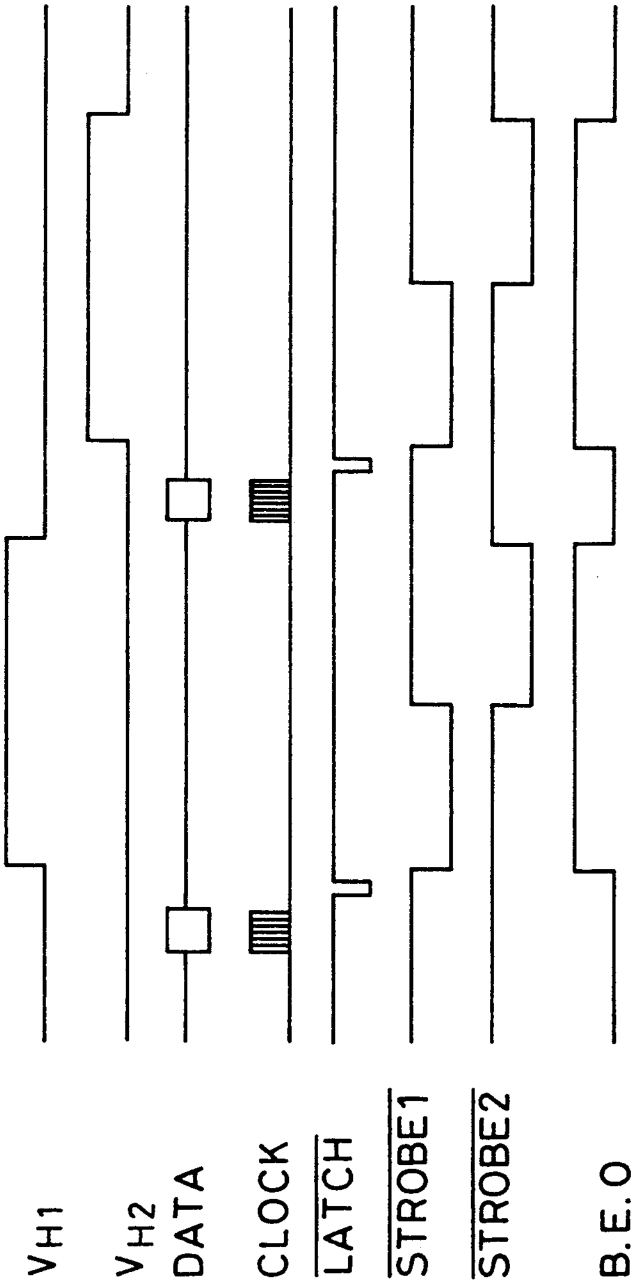
FIG. 3 is a timing chart for explaining the operation of the embodiment shown in FIG. 1.

FIG. 2 is a basic circuit diagram showing the above-mentioned driver integrated circuit which includes a drive circuit element 21, a switching circuit 22, a latch circuit 23, a shift register 24, an output protection circuit 25, etc. The operation with the driver integrated circuit is shown in a timing chart of FIG. 3. First, print data corresponding to odd print dots inputted to the shift register from a DATA terminal in synchronization with a CLOCK signal, and the latch circuit latches them in response to a $\overline{\text{LATCH}}$ signal. Then, drive voltage is applied to the common electrode VH1 of the even thermal elements, and a B.E.O. signal is activated to make the thermal elements ready for starting. With a $\overline{\text{STROBE 1}}$ driving pulse signal, even thermal elements in the thermal elements driven by the driver integrated circuits IC1 to IC8 are driven. Then, with a $\overline{\text{STROBE 2}}$ driving pulse signal, odd thermal elements in the thermal elements driven by the driver integrated circuits IC9 to IC16 are driven. In this way, the driving of the odd thermal elements in a single line is completed. Then, print data corresponding to even print dots are inputted to the shift register from the DATA terminal in synchronization with a CLOCK signal similar to the above example, and the latch circuit latches them in response to a $\overline{\text{LATCH}}$ signal. Then, drive voltage is applied to the common electrode VH2 to which the even thermal elements are connected, and a B.E.O. signal is activated to make the thermal elements ready for heating up. Similar to the above case, driving pulses of $\overline{\text{STROBE 1}}$ to $\overline{\text{STROBE 2}}$ are sequentially applied to drive the even thermal elements. Thus, the printing is completed by a single line.

Figure 11A:
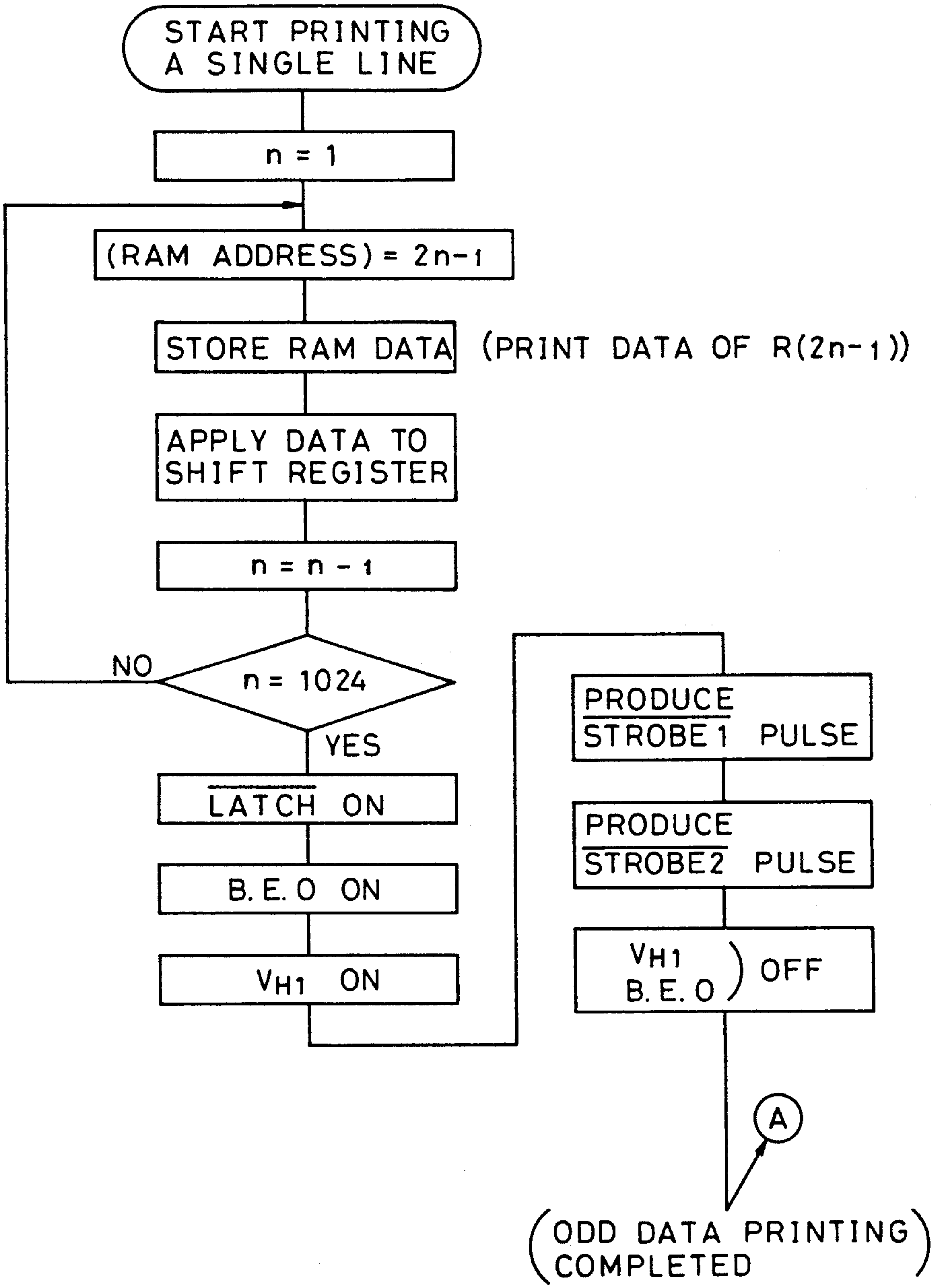
FIGS. 11(*a*) and 11(*b*) are flow charts explaining the operation of the circuits showing in FIGS. 1 and 2.
Figure 11:
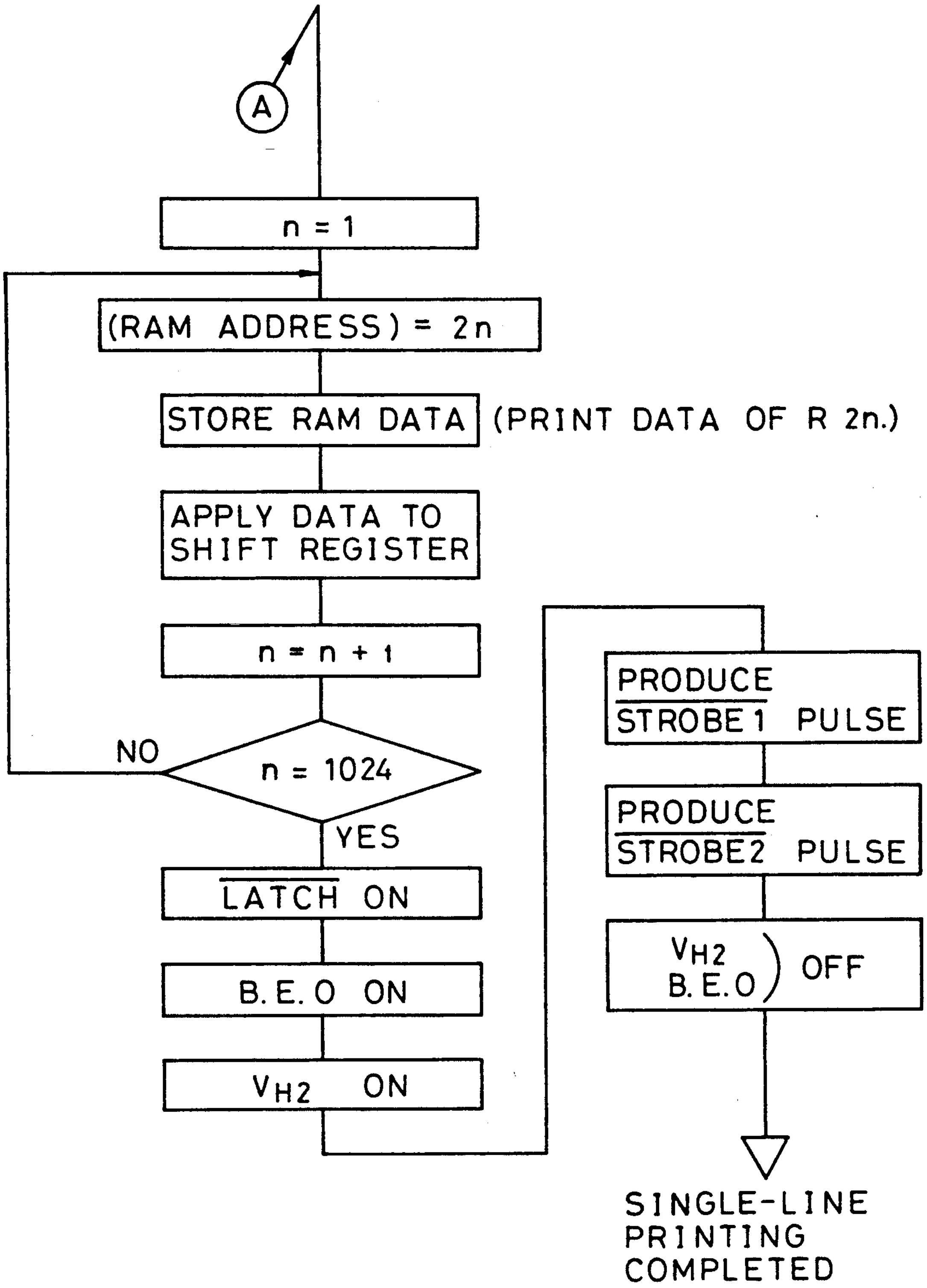

FIGS. 11(*a*) and 11(*b*) are flow charts explaining the above-mentioned driving method. In a RAM storing in order of addresses print data corresponding to a single line of the thermal elements R1 to R2048, an address in which print data of the thermal element R1 is stored is designated, and the data is read and inputted to the shift register in synchronization with a CLOCK signal. Then, the designated RAM address is incremented by two addresses to designate a RAM address storing print data of the thermal element R3. Similar to the thermal element R1, the data is read and inputted to the shift register. The input procedure previously mentioned is performed 1024 times to input a single line of odd print dot data.

With regard to a data input of even print dots, first, a RAM address storing print data of the thermal element R2 is designated and inputted to the shift register, and thereafter, data of the thermal resistors R2 to R2048 are inputted, with address being incremented similar to the above case.

Figure 4:
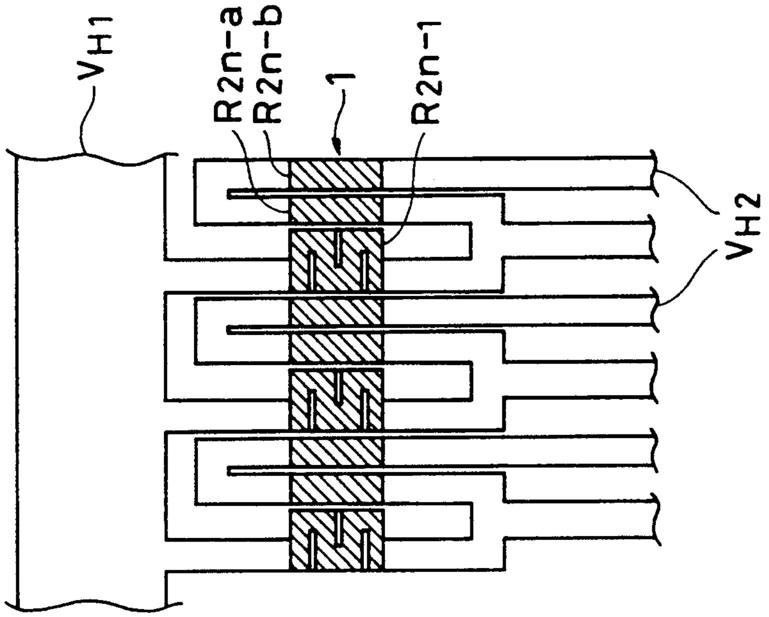
FIG. 4 is a plan view showing a configuration of a thermal element and a wiring pattern of the embodiment shown in FIG. 1.
Figure 6:
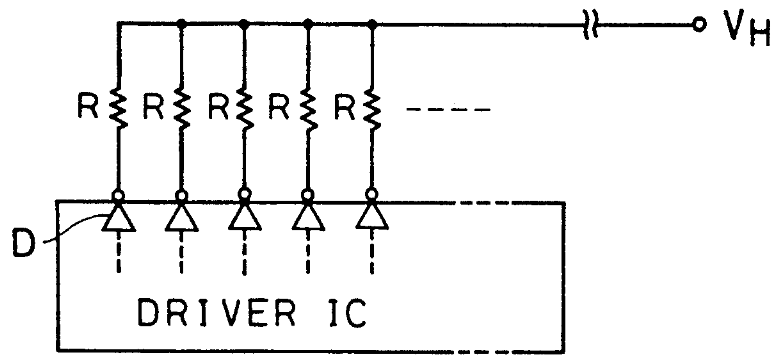
FIG. 6 (PRIOR ART)
FIGS. 6 to 8 are circuit diagrams showing prior art embodiments.
Figure 7:
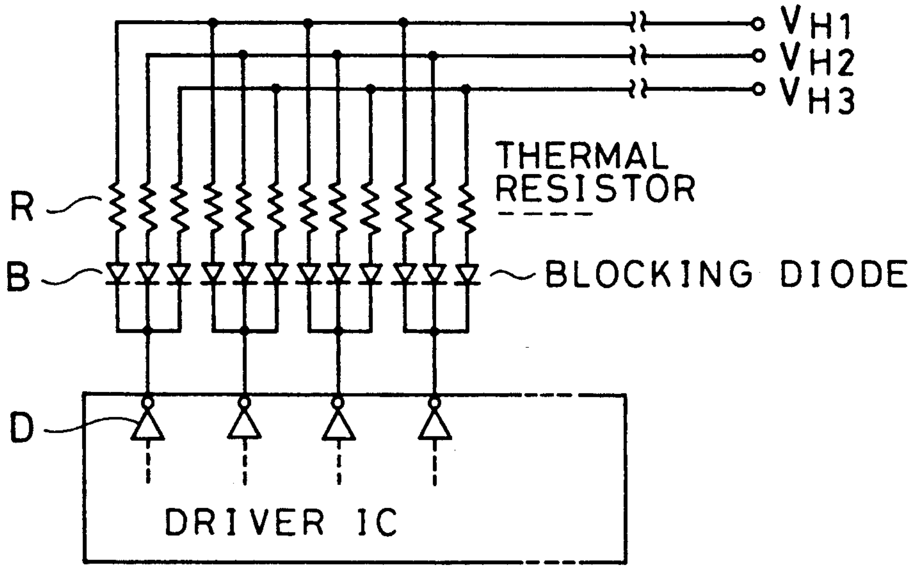
FIG. 7 (PRIOR ART)
Figure 8:
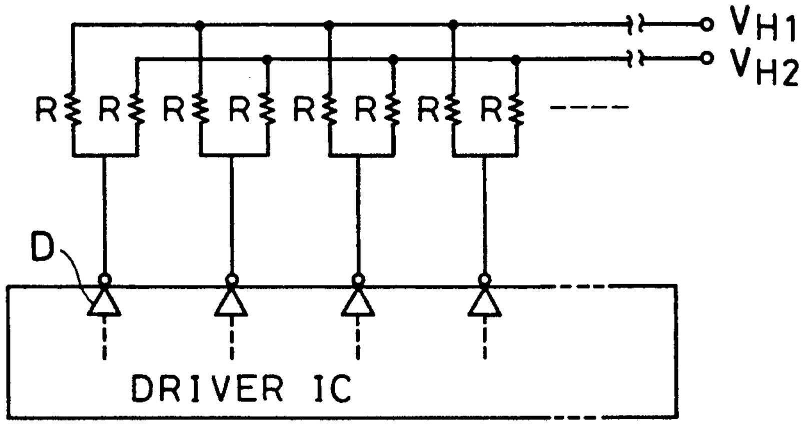
FIG. 8 (PRIOR ART)
Figure 9:
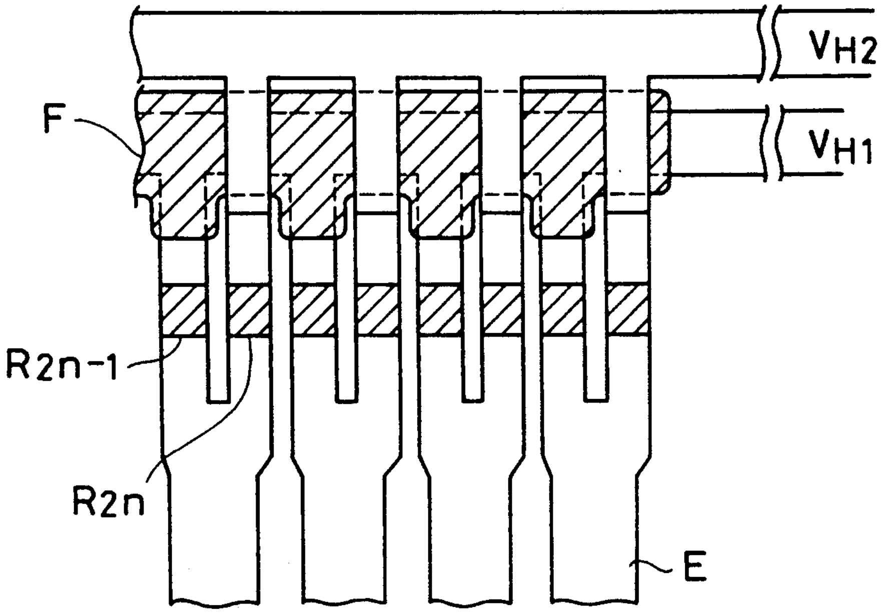
FIG. 9 (PRIOR ART)
FIG. 9 is a plan view showing a wiring pattern of a circuit shown in FIG. 8.

FIG. 4 is a plan view showing an exemplary configuration and pattern wiring of the thermal elements in the embodiment of the present invention. Each of the even thermal elements is formed of two thermal resistors $R2n-a$ and $R2n-b$ connected in series, while each of the odd thermal elements $R2n-1$ is formed of a single thermal resistor and its resistance value is set so that it generates the same heating amount as the total heating amount of the two thermal resistors $R2n-a$ and $R2n-b$. The thermal resistors is designed so that odd and even print dots have the same configuration.

Figure 5:
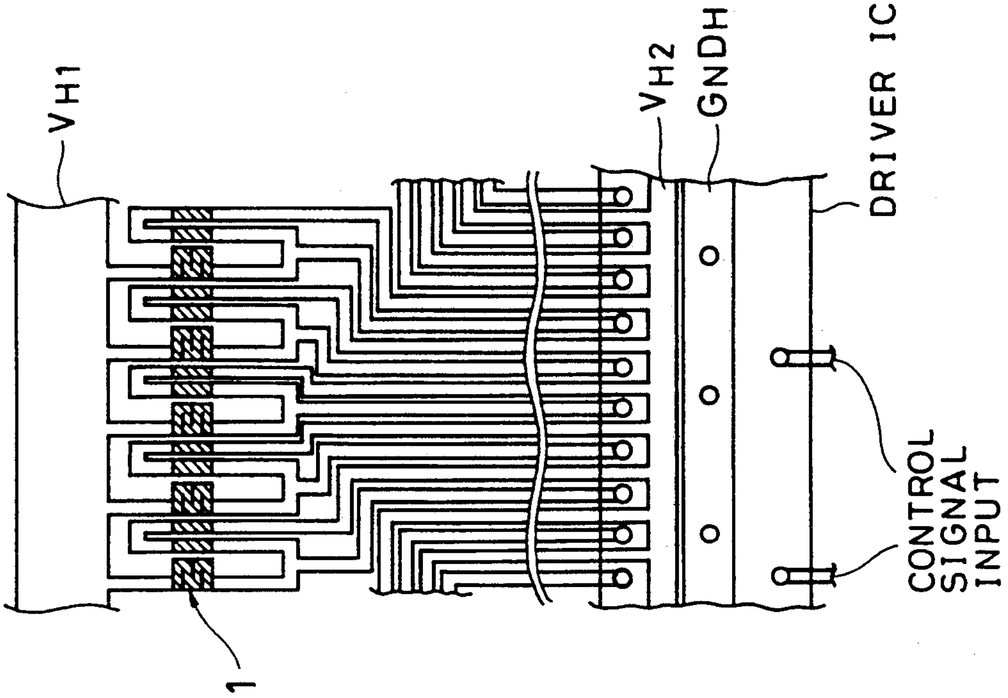
FIG. 5 is a plan view showing a wiring pattern of the thermal element and a driver integrated circuit.

FIG. 5 shows an example of a wiring pattern of electrodes connected to the thermal elements and the driver integrated circuit. In this example, a wiring pattern to the common electrode VH2 of the even thermal elements is manufactured between wiring patterns of the discrete electrodes, and they are connected under the driver integrated circuit to which a face down bonding is performed.

The common electrodes VH1, VH2 and a ground electrode GNDH require patterns as wide as possible because large current flows in them, and therefore, the electrodes may be connected to a thick electrode pattern through through-holes formed very closed to the bottom of the driver integrated circuit, in the bottom surface of the substrate.

As has been described, in the case of driving two print dots by a single drive circuit element, two thermal resistors are connected to make a desired wiring pattern for one of the print dots, so that all the thermal resistors can be wired without forming layer insulating and through-holes.

In attaching the driver integrated circuit to the substrate, a wire bonding method may be employed instead of a face down bonding method. Additionally, although a half-division driving is performed with $\overline{\text{STROBE 1}}$ to $\overline{\text{STROBE 2}}$ signals in the above embodiments, it is not intended that the present invention be limited to it.

According to the present invention, a layer insulating film and through-holes between fine patterns are not required, so that a cheap and compact thermal head can be easily manufactured through a small number of steps.

What is claimed is:

1. A thermal head comprising:

a substrate;

two common electrodes provided in parallel on said substrate;

a thermal element array including a plurality of thermal elements linearly disposed between said common electrodes, one of each adjacent pair of the thermal elements being formed of a single thermal resistor while the other is formed of two thermal resistors connected in series;

a plurality of driver ICs provided along said thermal element array and including a plurality of drive circuit elements for controlling said thermal elements in accordance with a print signal;

a first wiring pattern provided on said substrate for connecting two ends of each said adjacent pair of thermal elements in common to a respective one of said drive circuit elements;

second and third wiring patterns provided on said substrate for connecting the other ends of each said pair of thermal elements separately to the two common electrodes.

2. A thermal head according to claim 1, wherein said thermal element having a single thermal resistor and said thermal element having two thermal resistors are alternately disposed.

3. A thermal head according to claim 1, wherein each of said thermal elements has a resistance value which is set so that said thermal elements provide the same amount of heating.

4. A thermal head according to claim 1, wherein each of said driver ICs includes at least a shift register and a latch circuit.

5. A thermal head according to claim 1, wherein each of said driver ICs is attached to said substrate by a wire bonding method or a face down bonding method.

6. A thermal head according to claim 1, wherein said substrate is a heat-resisting resin substrate.

* * * * *